United States Patent
Al-Khattaf et al.

(10) Patent No.: US 12,398,248 B2
(45) Date of Patent: Aug. 26, 2025

(54) PRESSURE PIPES WITH IMPROVED BARRIER PROPERTIES TO $CO_2$

(71) Applicant: National Industrialization Company (TASNEE), Riyadh (SA)

(72) Inventors: Sulaiman S. Al-Khattaf, Dhahran (SA); Hafid Boufersaoui, Al-Jubail Industrial (SA); Omar S. Al Jebreen, Dammam (SA); Jousheed P. Kalathil, Mampad (IN)

(73) Assignee: National Industrialization Company (TASNEE), Riyadh (SA)

( * ) Notice: Subject to any disclaimer, the term of this patent is extended or adjusted under 35 U.S.C. 154(b) by 0 days.

(21) Appl. No.: 18/422,129

(22) Filed: Jan. 25, 2024

(65) Prior Publication Data
US 2025/0243328 A1     Jul. 31, 2025

Related U.S. Application Data

(60) Provisional application No. 63/443,140, filed on Feb. 3, 2023.

(51) Int. Cl.
    *C08J 3/20*                (2006.01)
    *C08K 5/098*            (2006.01)
    *F16L 9/12*                (2006.01)

(52) U.S. Cl.
    CPC .............. *C08J 3/203* (2013.01); *C08K 5/098* (2013.01); *F16L 9/12* (2013.01); *C08J 2323/08* (2013.01)

(58) Field of Classification Search
    CPC ....... C08J 3/203; C08J 2323/08; C08K 5/098; C08L 23/08
    See application file for complete search history.

(56) References Cited

U.S. PATENT DOCUMENTS

| | | | |
|---|---|---|---|
| 2007/0197716 A1* | 8/2007 | Krishnaswamy | ....... F16L 9/127 526/348.3 |
| 2010/0113698 A1* | 5/2010 | Walton | ................ C08L 23/0815 525/88 |

(Continued)

FOREIGN PATENT DOCUMENTS

| | | | | |
|---|---|---|---|---|
| CN | 115160471 A | | 10/2022 | |
| WO | WO-2014091309 A2 * | | 6/2014 | ............... C08K 3/34 |

(Continued)

OTHER PUBLICATIONS

HDPE Pipe Size Chart PDF from Provident Procurement snapshot taken Jul. 9, 2022 by Wayback Machine (Year: 2022).*

(Continued)

*Primary Examiner* — Mark S Kaucher
(74) *Attorney, Agent, or Firm* — Dunlap Codding, P.C.

(57) ABSTRACT

The present disclosure provides a composition, and pressure pipes produced therefrom, comprising a multimodal high-density polyethylene and from about 0.10% to about 0.30% nucleating agent to improve the barrier property of high-density polyethylene pressure pipes to $CO_2$ gas. The pressure pipes produced with this composition will convey $CO_2$ gas with reduced permeation rates in the range of from about 30% to about 40% compared to control high-density polyethylene pressure pipes made from the same multimodal high-density polyethylene that does not contain nucleating agent.

7 Claims, 1 Drawing Sheet

(56) References Cited

U.S. PATENT DOCUMENTS

| | | | | |
|---|---|---|---|---|
| 2015/0175787 A1* | 6/2015 | Zia | ............. | C08L 23/06 |
| | | | | 524/506 |
| 2019/0248991 A1* | 8/2019 | Suchao-In | ............. | C08L 23/06 |
| 2020/0277474 A1* | 9/2020 | Lin | ............. | C08L 23/06 |

FOREIGN PATENT DOCUMENTS

| | | | | | |
|---|---|---|---|---|---|
| WO | WO-2018000091 A1 * | 1/2018 | | ............. | F16L 11/08 |
| WO | WO-2019132694 A1 * | 7/2019 | | ............. | C08L 23/04 |
| WO | WO-2021053411 A1 * | 3/2021 | | | |

OTHER PUBLICATIONS

International Search Report and Written Opinion dated Jun. 13, 2024 in PCT/IB2024/000104, filed Feb. 5, 2024.

* cited by examiner

PRESSURE PIPES WITH IMPROVED BARRIER PROPERTIES TO $CO_2$

INCORPORATION BY REFERENCE STATEMENT

This application claims priority to U.S. Provisional Application 63/443,140 filed Feb. 3, 2023, the entire contents being hereby expressly incorporated herein by reference.

BACKGROUND OF THE DISCLOSURE

The following disclosure generally relates to a polyethylene composition and, more specifically, to a multimodal polyethylene material and nucleating agent for producing pipe having improved carbon dioxide gas barrier properties.

The aim of Carbon Capture, Utilization and Storage (CCUS) value chain is to reduce greenhouse gas emissions for different technologies. These technologies capture carbon dioxide from different sources, and then transport it to different storage locations or utilization for different industrial applications. CCUS is drawing attention more and more globally; however, getting $CO_2$ from source to storage requires a large and safe carbon dioxide transportation network. As emphasized by Drax Group on their website www.drax.com, transporting carbon dioxide safely is a key issue [1]. The Research Counsel of Norway stated that the key to ensure the viability carbon capture is to avoid leakages or failures within the entire transport chain. The $CO_2$ capture effort should not be lost due to leakage during transportation [2].

One of the suggested transportation solutions, is the use of high-density polyethylene (HDPE) pipes, as in the list proposed by SINTEF, one of Europe's largest independent research organizations [3]. Polyethylene pressure pipes are broadly used in transportation of natural gas due to their good corrosion resistance, low-cost maintenance, easy handling, and welding, etc. A main advantages of polyethylene pipe networks are relatively low installation costs and ease of maintenance. If new and existing polyethylene networks prove to be suitable for the distribution of $CO_2$, this is likely to offer new and economically interesting opportunities to transport excess volumes.

However, the transported $CO_2$ can permeate through the pipe wall into the air and the environment. Because the $CO_2$ molecule is small, having a kinetic diameter 3.33 Å, the leakage can be expected [4]. However, this permeation remains a concern and a safety issue. The mode of gas permeation is believed to be mainly a physical process rather than chemical attack.

High-density polyethylene (HDPE) pipes are the material of choice for many of these gas transportation applications. However, there is a need to improve the barrier properties of HDPE pressure pipes.

SUMMARY OF THE DISCLOSURE

A method for improving the barrier properties of a multimodal high-density polyethylene (HDPE) pressure pipe used for gas transportation includes the following steps. A mixture comprising a multimodal high-density polyethylene (HDPE) and a nucleating agent is converted into a pressure polyethylene pipe. The HDPE has a melt flow ratio (MFR) ($5k$ [f] g/190° C.) within the range of 0.19 to 0.30 dg/min, and the nucleating agent comprises zinc stearate and 1,2-cyclohexanedicarboxylic acid, calcium salt. The pressure polyethylene pipe has at least from 30% up to 40% improvement of barrier properties to $CO_2$ gas compared with a control multimodal HDPE pressure polyethylene pipe which is made from the same multimodal HDPE but does not contain the nucleating agent.

In one embodiment, a mixture comprises a multimodal high-density polyethylene copolymer of 1-butene or 1-hexene and from about 0.10% to 0.30% of nucleating agent, wherein the nucleating agent comprises a mixture of zinc stearate and 1,2-cyclohexanedicarboxylic acid, calcium salt. In another embodiment, this mixture is used for manufacturing pressure polyethylene pipes used for $CO_2$ gas transportation.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. In the drawings.

DETAILED DESCRIPTION OF EXEMPLARY EMBODIMENTS

Figures 1A, 1B:
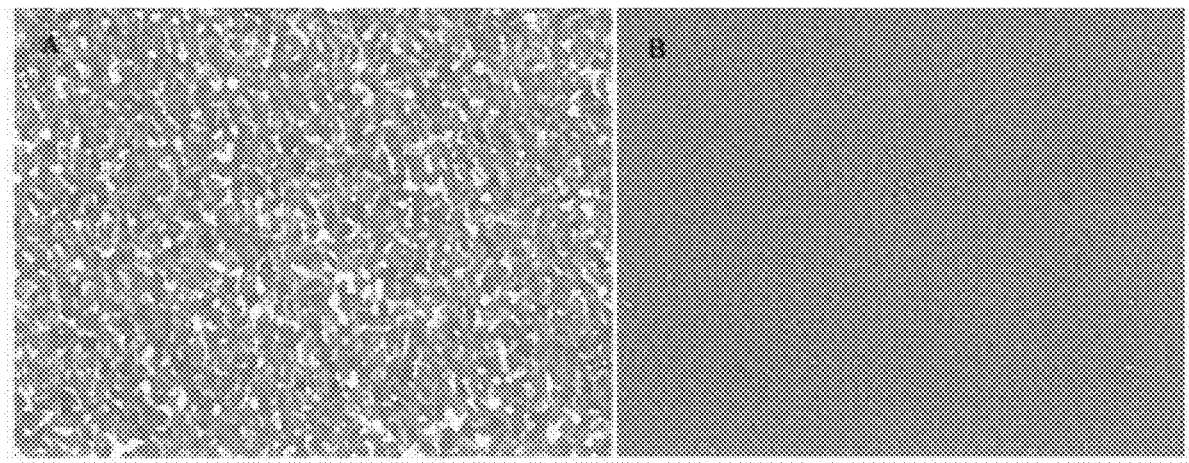
FIGS. 1A and 1B compare the crystallization of polyethylene without a nucleating agent (FIG. 1A) to the crystallization with a nucleating agent (FIG. 1B). These pictures were taken by hot stage polarized light microscopy at 500X.

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All of the articles and/or methods disclosed herein can be made and executed without undue experimentation in light of the present disclosure. While the articles and methods of the present disclosure have been described in terms of preferred embodiments, it will be apparent to those skilled in the art that variations may be applied to the articles and/or methods and in the steps or in the sequence of steps of the method described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings:

The use of the word "a" or "an" when used in conjunction with the term "comprising" in the claims and/or the specification may mean "one", but it is also consistent with the meaning of "one or more," "at least one," and "one or more than one." The use of the term "or" in the claims is used to mean "and/or" unless explicitly indicated to refer to alternatives only or that the alternatives are mutually exclusive, although the disclosure supports a definition that refers to only alternatives and "and/or."

Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

The term "associate" as used herein will be understood to refer to the direct or indirect connection of two or more items.

In this disclosure, it can be seen that the use of a suitable nucleating agent with high-density polyethylene (HDPE) significantly improves the barrier property for carbon dioxide gas by reducing the permeation rate. This is interesting because the addition of nucleating agent to high-density polyethylene (HDPE) is uncommon because HDPE readily crystallizes without nucleating agent.

The present disclosure provides a composition, and pressure pipes produced therefrom, comprising a high-density polyethylene and from about 0.1% to about 0.3% nucleating agent to improve the barrier property of high-density polyethylene pressure pipes to carbon dioxide gas. The pressure pipes produced with this composition will convey $CO_2$ gas with reduced permeation rates in the range of about from 30% to about 40% compared to the control high-density polyethylene pressure pipes made from the same high-density polyethylene but without a nucleating agent.

It is believed that addition of nucleating agent to polyethylene, semi-crystalline material, provides a large number of sites for growth upon cooling from a melt. When cooling polyethylene from molten state into solid form, the number of nuclei formed increases in a given time interval at a predetermined temperature. Polyethylene has both amorphous and crystalline regions, which makes the prediction of permeation properties complicated due to the presence of two distinct phases. The crystalline regions form polycrystalline aggregates known as spherulites, and the overall crystallinity depends on the number of nuclei that are formed and also on the spherulite growth rate from such nuclei.

The small spherulites continue to grow until they impinge on adjacent spherulites. Subsequently, the free space is reduced. Thus, polyethylene pipes produced from nucleated compound material also have improved stiffness properties. FIGS. 1A and 1B show two different behaviors of pipes. FIG. 1A pipe is extruded with control material (without nucleating agent) and FIG. 1B shows pipe extruded with a composition comprising multimodal high-density polyethylene and a nucleating agent. The results reveal a significant difference observed between the two types of pipes. The test was conducted for 21 days There are several factors that affect the permeability of polymers to carbon dioxide, including crystallinity, chain orientation, fillers, and side chain complexity. All of these properties affect the free volume available for molecular diffusion of permeant species. Free volume is defined as the unoccupied region included in the polymer volume that is accessible to polymer chain segmental motions. The presence of free volume enables molecular gas diffusion in that the diffusing species moves from one open "site" to another by chain movement into the free volume space. The available free volume can change drastically with minimal changes in polymer properties. In the presence of nucleating agent, which reduces spaces as mentioned above, and the increased stiffness will also reduce the mobility of the chain motion, creating torturous path. The morphological structure in which the crystalline units are arranged, affects the barrier properties of the polyethylene.

We have found that improved $CO_2$ gas barrier properties can be achieved with good dispersion and homogeneity of nucleated polyethylene in the matrix and with selected nucleating agent.

EXAMPLES

Multimodal polyethene material in pellet form was compounded with nucleating agent from about 1000 ppm to about 3000 ppm. The nucleating agent used was Hyperform HPN-20E commercially available from Milliken Chemical. Hyperform HPN-20E comprises, according to the safety data sheet (SDS), 34% zinc stearate, and 66% 1,2-cyclohexanedicarboxylic acid, calcium salt. The final content of nucleating agent in the composition is in the range of 1000 ppm to 3000 ppm. This composition is suitable for producing HDPE pressure pipes with a permeation rate reduction in the range of 30% and 40% compared to the same multimodal polyethylene pressure pipes without nucleating agent.

Compound Preparation Procedure

In this disclosure, the process the nucleated compound consists of two steps to achieve a good dispersion and good homogeneity. The first step is to prepare a pre-compound comprising multimodal high-density polyethylene material mixed with the nucleating agent, using Coperion twin screw extruder line. The second step is to add the pre-compound to neat multimodal high-density polyethylene material, to get the final composition comprising multimodal high-density polyethylene material with about 0.10% up to about 0.30% of nucleating agent. Assessment of the physical and mechanical properties of the nucleated and non-nucleated compositions showed no significant changes. Some values are reported in Table 1 below.

TABLE 1

Example testing results of control material and nucleated material

| No. | Properties | Control Multimodal HDPE | Multimodal HDPE with Nucleating Agent |
|---|---|---|---|
| 1 | MFR @ 5 kg, dg/min | 0.20-0.30 | 0.20-0.30 |
| 2 | Density, g/cm$^3$ | 0.956-0.961 | 0.956-0.961 |
| 3 | OIT @ 210° C., min | >60 | >60 |
| 4 | Charpy @ 23° C., KJ/m$^2$ | 29.02 ± 0.76 | 21.45 ± 0.54 |
| 5 | Yield stress, MPa | 23 ± 0 | 23 ± 1 |
| 6 | Yield strain, MPa | 10 | 9 |
| 7 | Chord modulus, MPa | 979 ± 10 | 965 ± 20 |
| 8 | Tensile creep Modulus @ 24 hr, MPa | 1337 ± 151 | 1401 ± 259 |
| 9 | Hydrostatic pressure tests 20° C./12.0 MPa ISO4437 | >100 hours | >100 hours |

In the final step, the compound comprising multimodal copolymer polyethylene material with 0.10% to 0.30% of nucleating agent and control multimodal copolymer polyethylene, having a melt flow rate (MFR) of from 0.20 dg/min to 0.30 dg/min according to ISO 1133, and density of 0.956 g/cm$^3$ to 0.970 g/cm$^3$ according to ISO 1183, were extruded into pressure pipes. Pipe diameter produced is 32 mm/SDR11 using a Krauss Maffei single screw extruder.

The extruded pipes were tested for hydrostatic creep tests with conditions of 20° C. and applied stress of 12.0 MPa. As can be seen from Table 1, both pipe compositions passed more than 100 hours according to ISO 4437-2.

$CO_2$ Permeation Pipe Testing Procedure

Tests were conducted in external laboratory, Kiwa Technology B. V. Netherlands, to perform the $CO_2$ permeation testing. Permeation measurements were performed with pure gaseous carbon dioxide on a high-density polyethylene pipe made from compounds as prepared above. The setup consisted of one steel jacketed pipe to accommodate the polyethylene diameter pipe. Polyethylene pipe is installed in the steel pipe jacket and closed with sealed end caps. The steel jacket pipe is filled with 100% nitrogen and the polyethylene pipe is filled with 100% $CO_2$ dry and more than 99% purity. Over time, the $CO_2$ permeates the polyethylene pipe wall and reaches a steady state. The $CO_2$ gas from the plastic pipe is accumulated in the steel jacket pipe. The permeation rate testing was performed under high operational pressure of 6.3 bars (g) and temperature 23° C. to 25° C. The concentration of $CO_2$ gas is measured in the jacket steel pipe over time by using a gas chromatography technique. The permeation coefficient for carbon dioxide gas is then calculated using the formula in EQ. 1 explained below.

Permeation measurements were performed on the HDPE with pure $CO_2$ gas, 99.9%. Hence, the intrinsic permeability coefficient of each type of pipe was determined along with timing. The objective of such measurements was to assess the performance of the different composition pipes.

Permeation testing was conducted on polyethylene pipe with diameter 32.0-32.3 mm and thickness of 3.0 to 3.4 mm and reached steady-state within a few weeks. Therefore, measurements started and lasted for three weeks. Another regular pipe made from the same polyethylene material but without nucleating agent was used as a control sample for the same experimental permeation tests. The 32 mm diameter pipes were used due to the advantage of narrow wall thickness range from 3.0 mm to 3.3 mm which shortened the test time duration for the permeation tests.

The polyethylene pipes tested were smooth without scratches on the surface and no defects to avoided complicating the test significantly. Leak tight connection between the end caps and pipe was ensured. Tests are applied for both types of polyethylene pipes, having compositions with and without nucleating agent.

The relationship between the permeation rate and the permeation coefficient (PC) is linear, and is given by the following formula:

$$PC = (Qp \times e)/(A \times \Delta p) \qquad \text{EQ. 1}$$

wherein:

PC=Permeation Coefficient, (ml·mm)/(m$^2$·bara·day)
QP=Permeated Volume, ml/day
e=Wall thickness, mm
$\Delta p$=difference in partial pressure (absolute), bara
A=area of the pipe, m$^2$ (the area is calculated by using the average of the inner and outer diameter, and the length of the pipe)

Figure 2:
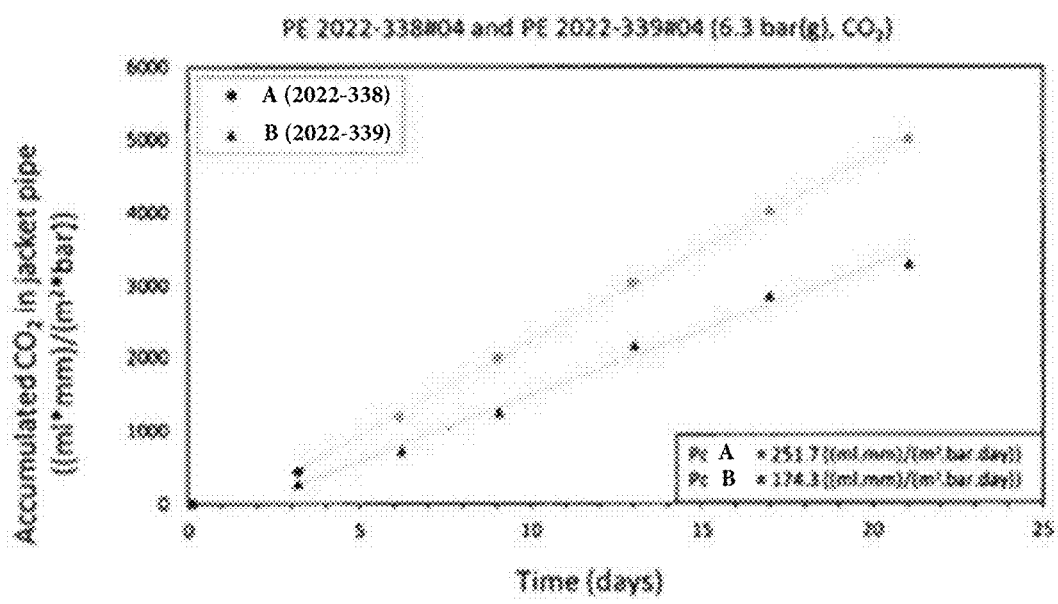
FIG. 2 is a graph comparing PE 2022-338 #04 pipe (referred to as A in the graph) extruded with control HDPE material (without nucleating agent) and pipe extruded with PE 2022-339 #04 (referred to as B in the graph) comprising multimodal HDPE and nucleating agent. Permeation rates as a function of time and permeation constant for each sample are shown. The results reveal a significant difference observed between the two types of pipes. Tests were conducted for 21 days.

The permeation coefficients (PC) of both types of pipes are reported in FIG. 2. The PC of the material can be used to calculate the volume loss of the total pipe by permeation using the following formula:

$$QP = (PC \times \pi \times (SDR - 1) \times L \times \Delta p)/1000 \qquad \text{EQ. 2}$$

Pipe Testing Procedure

Tests were conducted in the laboratory by KIWA Netherland for 21 days on polyethylene pipe with diameter in range of 32.0 mm to 32.3 mm and thickness of 3.0 mm to 3.4 mm. The results showed a significant reduction of $CO_2$ permeation rate with compositions having about 0.10% to about 0.30% of nucleating agent compared to compositions without nucleating agent. The percentage reduction in the permeation rate was in a range of 30% to 40%. Subsequently, the permeation coefficients show the significant improvement, i.e., more than 28% reduction compared to control and regular samples as shown in FIG. 2.

REFERENCES

[1] https://www.drax.com/carbon-capture/transporting-carbon-how-to-safely-move-co2-from-the-atmosphere-to-permanent-storage/
[2] https://prosjektbanken.forskningsradet.no/en/project/FORISS/308765?Kilde=FORISS&distribution
[3] Effect of $CO_2$ on the polymeric materials present across the $CO_2$ transport chain. (15th International Conference on Greenhouse Gas Control Technologies GHGT-15, 5th-8th October 2020, Abu Dhabi, UAE) L. Ansaloni, B. Alcock, T. A. Peters
[4] Diffusion of $CO_2$ through polymer membranes, Chatrine Hogseth Olsen, Morten Augestad, Irene Helland, Britti M. E. Moldstad & Marianne S. Eikeland, ENVIRONMENTAL IMPACT V 211

What is claimed is:

1. A method for reducing $CO_2$ gas permeation rate of a multimodal high-density polyethylene (HDPE) pressure pipe used for $CO_2$ gas transportation, the method comprising:
   a first step of preparing a pre-compound comprising multimodal HDPE mixed with nucleating agent using an extruder, said pre-compound comprising a multimodal {HDPE} copolymer of 1-butene and a nucleating agent, wherein the HDPE has a melt flow ratio (MFR) (5 kg/190° C.) within a range of 0.19 to 0.30 dg/min and a density within the range of 0.940 to 0.970 g/cm$^3$, and the nucleating agent comprises about 34% by weight zinc stearate and about 66% by weight 1,2-cyclohexane dicarboxylic acid, calcium salt;
   a second step of adding the pre-compound to neat multimodal HDPE to form a composition comprising multimodal HDPE copolymer having from about 0.10% to 0.30% by weight nucleating agent; and
   a third step of extruding the composition into a pressure pipe for use for $CO_2$ gas transportation.

2. The method of claim 1, wherein the pressure polyethylene pipe has a wall thickness in a range of about 3.0 mm to about 3.4 mm.

3. A method for reducing $CO_2$ gas permeation rate of a multimodal high-density polyethylene (HDPE) pressure pipe used for $CO_2$ gas transportation, the method comprising:
   a first step of preparing a pre-compound comprising multimodal HDPE mixed with nucleating agent using an extruder, wherein the multimodal HDPE has a melt flow ratio (MFR) (5 kg/190° C.) within the range of 0.19 to 0.30 dg/min and a density within the range of 0.940 to 0.970 g/cm$^3$ and the nucleating agent comprises about 34% by weight zinc stearate and about 66% by weight 1,2-cyclohexane dicarboxylic acid, calcium salt;
   a second step of adding the pre-compound to neat multimodal HDPE to form a composition comprising multimodal HDPE copolymer having from about 0.10% by weight to 0.30% by weight nucleating agent; and
   a third step of extruding the composition into a pressure pipe for use for $CO_2$ gas transportation.

4. The method of claim 3, wherein the multimodal HDPE comprises a 1-butene copolymer.

5. The method of claim 3, wherein the multimodal HDPE comprises a 1-hexene copolymer.

6. The method of claim 3, wherein the pressure polyethylene pipe has a diameter in a range of from about 32 mm to about 32.3 mm.

7. The method of claim 3, wherein the pressure polyethylene pipe has a wall thickness in a range of about 3.0 mm to about 3.4 mm.

* * * * *